United States Patent [19]
Kubala

[11] Patent Number: 5,657,524
[45] Date of Patent: Aug. 19, 1997

[54] APPARATUS FOR HANDLING WEB ROLL SHAFTS AND CORES

[76] Inventor: Zbigniew Kubala, 11415 Edgewood, Waukegan, Ill. 60087

[21] Appl. No.: 502,111

[22] Filed: Jul. 13, 1995

[51] Int. Cl.6 ...................................................... B23P 19/04
[52] U.S. Cl. ............................ 29/234; 29/255; 254/423; 254/3 R
[58] Field of Search ....................... 29/234, 235; 242/557, 242/403, 403.1; 414/908, 910, 911, 995, 618; 254/81, 29 R

[56] References Cited

U.S. PATENT DOCUMENTS

| | | | |
|---|---|---|---|
| 3,931,956 | 1/1976 | Hawkins | 254/8 B |
| 4,150,813 | 4/1979 | Mena | 254/86 H |
| 4,384,395 | 5/1983 | Gletman | 29/234 |
| 4,593,883 | 6/1986 | Nelson | 254/7 B |
| 4,934,413 | 6/1990 | Yao | 254/58.6 |
| 5,029,376 | 7/1991 | Sharp, Jr. | 29/234 |
| 5,195,726 | 3/1993 | Kaner | 254/325 |
| 5,340,260 | 8/1994 | Turra et al. | 414/911 |

OTHER PUBLICATIONS

Conco-Tellus, An Interlake Company catalog 1983, p. 3.
N.R.S. Systems Inc. Hyes 1991.
International Expanding Schafts Hyes.
John and Won Burt Limited advertisement.

Primary Examiner—Timothy V. Eley
Assistant Examiner—Lee Wilson

[57] ABSTRACT

A portable, manually operated shaft handling apparatus (10), supported by swiveling wheels (12), (13), and (14) having a carriage (60) capable of counterbalancing the weight of the shaft (18) using air springs (50), and (51). The carriage will receive the shaft from the hoist (16) of an unwinding machine, and will strip the core (19) of an expended roll from the shaft utilizing compressed air. The apparatus is able to transport the shaft and insert it into the core of a new web roll (17) without any manual handling of the shaft. The apparatus can be adjusted for use with a variety of shafts having different weights and lengths.

6 Claims, 8 Drawing Sheets

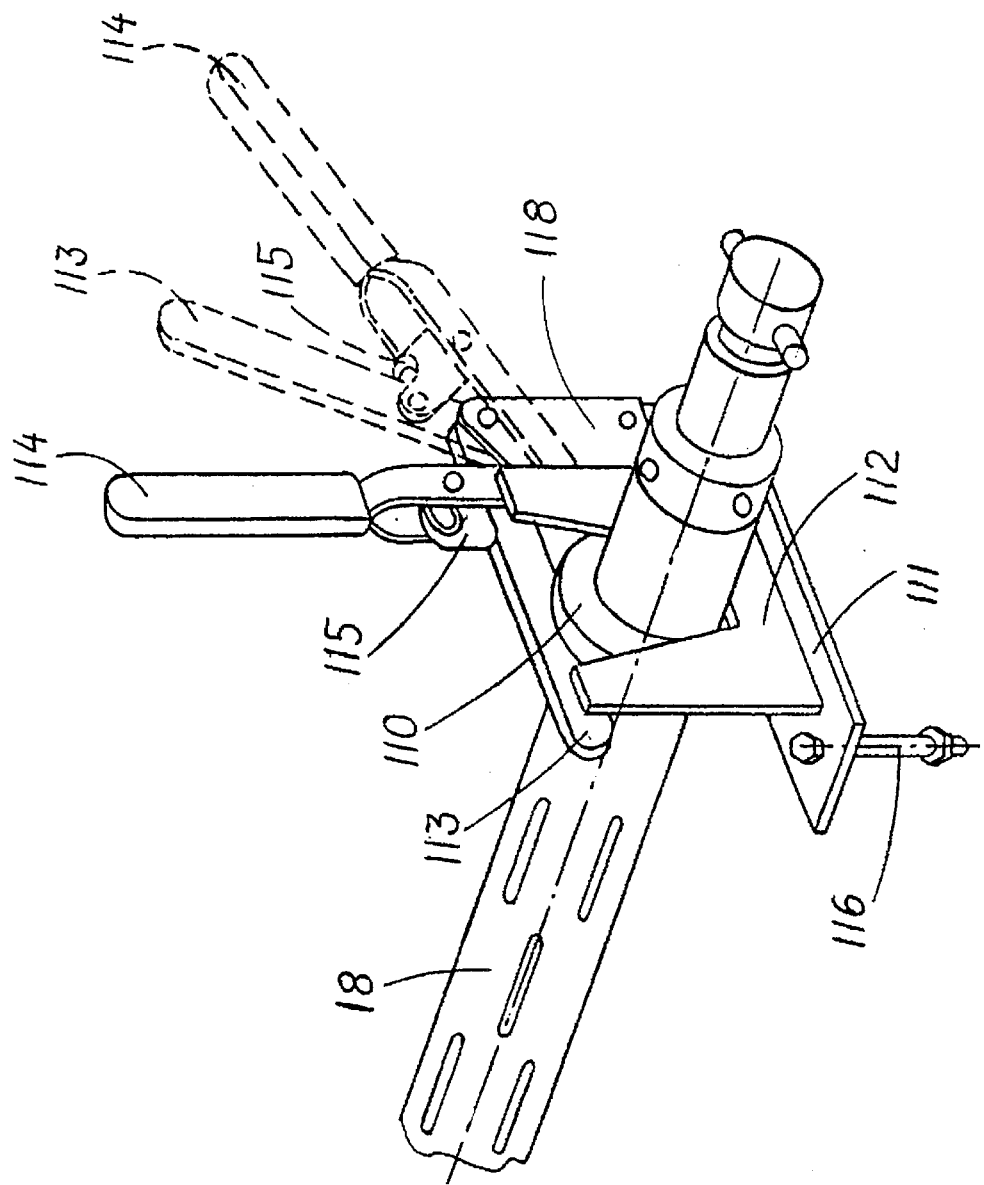

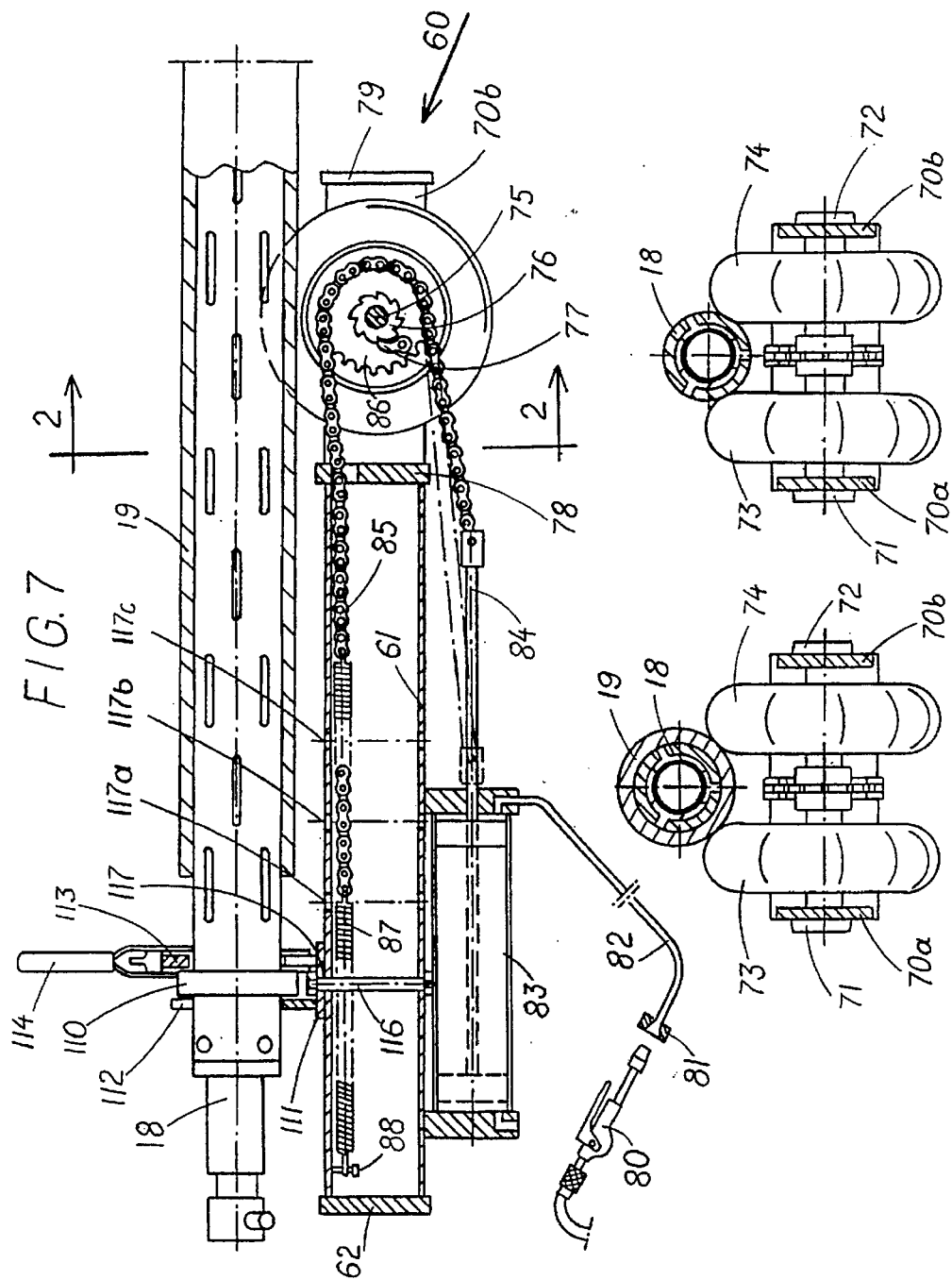

APPARATUS FOR HANDLING WEB ROLL SHAFTS AND CORES

BACKGROUND—FIELD OF INVENTION

This invention relates to web roll shaft handling apparatus, and it relates more specifically to a portable, manually operated, web roll shaft handling apparatus for removing the core of an expended web roll from the shaft and transferring this shaft into the core of a new web roll.

BACKGROUND—DESCRIPTION OF PRIOR ART

Printing and converting processes utilize such materials as paper, plastic foil, and fabrics. These materials are supplied in large and often very heavy rolls that have a hollow core in the center. For the purpose of unwinding the roll, a strong and usually heavy shaft is inserted into the core of the roll. The shaft is typically made of a material such as steel, and is used to support the roll during the unwinding process. Once the material is unwound from the roll, the empty core must be removed from the shaft. This shaft then must be inserted into the core of a new roll.

In most cases, an operator must manually remove the empty core from the shaft. The operator must then carry the heavy shaft to the core of a new roll. Since shafts are very heavy, back injuries and fatigue are common among the operators.

Previously, inventors have attempted to solve the problem of handling web shafts by creating shaft handling machines. The mechanisms employed in such machines vary in their concept. Some inventors created shaft handling devices that resemble a jib crane. Examples of this design can be found in a catalog of Conco-Tellus, an Interlake Company, and in a catalog of N.R.S. Systems Inc. Other attempted solutions involve electrically powered stationary arms that eliminate the need for carrying a shaft. An example of this design can be found in U.S. Pat. No. 5,029,376, to Kenneth J. Sharp. However, both of these concepts require a relatively large machine that must be permanently anchored to the floor. Such machines often occupy large amounts of space which is in most cases limited. Also, these machines are known to be slow and relatively difficult to operate. Another concept for handling heavy shafts resulted in creation of movable machines. An example of this design can be found in U.S. Pat. No. 4,384,395, to Lambert J. Gietman; Paul J. Klemmer where the machine is supported by an air pallet which is floating on an air film over the surface of a floor. All mechanisms of this machine are driven by air motors. Another concept of portable machine is shown in a catalog of John & Wm Burt Limited, and in the catalog of I.E.S. Company. These machines are smaller and are equipped with wheels that allow their movement over a floor. However, these movable machines must have a wide and long base. The large base makes maneuvering such machines relatively difficult especially because the front wheels are mounted rigidly. These machines require that the shaft be held and supported by only a small portion of one of its ends. This type of shaft attachment not only strains a shaft due to bending forces, but also requires the attachment mechanism, as well as the size of the entire machine to be custom designed for every particular shaft. The height adjustment of the shaft and leveling of the shaft is done by slowly acting and difficult to operate mechanical or hydraulic mechanisms.

BRIEF SUMMARY OF THE INVENTION

Because of the serious disadvantages of the currently known stationary and portable shaft handling devices including the problems discussed in the preceding section, most shaft manipulation is currently done manually.

The object of this invention is to provide a new portable shaft handling apparatus that eliminates the need for manual handling and at the same time addresses the disadvantages of currently existing designs.

The shaft-handling apparatus of the present invention is easily adaptable to a wide range of shaft lengths, weights and configurations of shaft ends. This adaptability eliminates the need to custom design any part of the apparatus to make it compatible with a given shaft. Thus, the present invention is useful for a broad range of applications, shaft sizes and shaft types.

The present invention has easy means of counterbalancing the weight of the shaft with air springs. The air pressure in the springs can easily be adjusted to accommodate shafts of varying weights while allowing easy, flexible up and down movements of the shaft for convenient alignment with the core of a new web roll.

Air pressure from a simple commercial air gun may be used to remove the core of an expended roll from the shaft.

With the present invention, the shaft is conveniently and safely supported and locked in two widely spaced areas. This eliminates the excessive bending stresses in the shaft that are associated with currently known portable shaft handling devices.

The apparatus of the present invention is easily maneuverable over the floor because, unlike other known designs, all of the wheels of the present invention swivel, thereby allowing omni-directional movements. This is an important advantage in production facilities having limited space.

Further objects and advantages of the present invention will be apparent to those of skill in the art from the following drawings and detailed description.

DESCRIPTION OF THE DRAWINGS

FIG. 6 is an isometric view of the shaft supporting and locking mechanism of the present invention;

FIG. 7 is a sectional as taken on view lines 1—1 of FIG. 1 illustrating the core stripping mechanism, and shaft supporting and locking mechanism of the present invention;

FIG. 8 is a sectional view as taken on lines 2—2 of FIG. 7, illustrating the core stripping mechanism of the present invention supporting a shaft with the core;

FIG. 9 is a sectional view as taken on lines 2—2 of FIG. 7, illustrating the core stripping mechanism of the present invention supporting the shaft after the core is removed from the shaft;

DESCRIPTION OF THE PREFERRED EMBODIMENT

Figure 1:
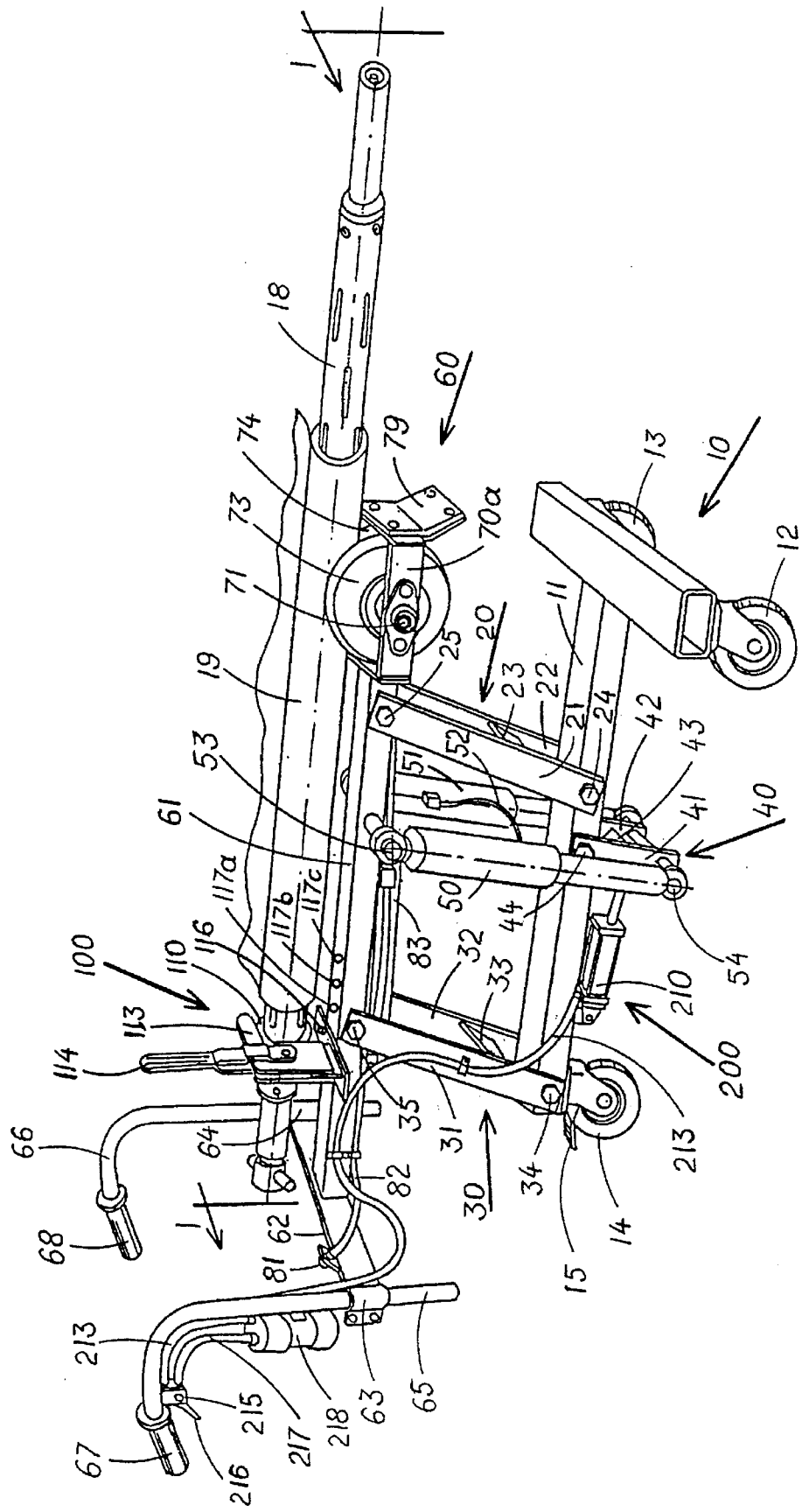
FIG. 1 is an isometric view of the shaft handling apparatus of the present invention with the shaft and core of the expended roll on the shaft.

Refer now to FIG. 1 of the drawings. A shaft handling apparatus 10 is shown after receiving a shaft 18 with a core of an expended roll 19 from a hoist 16 shown on the FIG. 2. The apparatus 10 has a T-shaped base 11 preferably welded from rectangular cross-section tubing. The base 11 has a swiveling wheels 12, 13, and 14 bolted to the bottom side of each end of the T-shape. The swiveling wheel 14 has a foot operated brake 15.

The apparatus 10 has a carriage 60 which will be described in more detail later.

As shown in FIG. 1, the shaft 18 protrudes in front of the carriage 60. The protruding portion may be introduced into the core of a new web roll 17, as shown on FIG. 4.

Referring again to FIG. 1, a front supporting beam 20 is constructed out of two plates 21 and 22, which are interconnected with a plate 23 preferably attached by welding. The beam 20 is pivotally mounted to the base 11 by a bolt 24, and also pivotally mounted to a carriage 60 by a bolt 25.

A rear supporting beam 30 is constructed out of two plates 31 and 32, which are interconnected by a plate 33 preferably attached by welding. The beam 30 is pivotally mounted to the base 11 by a bolt 34 and is also pivotally mounted to the carriage 60 by the bolt 35.

A bottom suspending beam 40 is constructed out of two plates 41 and 42, which are interconnected by a plate 43 preferably attached by welding. The beam 40 is pivotally suspended from the base 11 on a bolt 44.

Air springs 50 and 51 are interconnected with an air hose 52. The air springs are pivotally attached to the carriage 60 with a shaft 53 and are also pivotally attached to the bottom suspending beam 40 by a shaft 54.

The carriage 60 has its central portion 61 preferably made out of tubing having a rectangular cross-section. A flat plate 62 is perpendicularly welded to the rear end of the carriage 60. L-shaped handle bars 65 and 66 are adjustably mounted by releasable clamps 63 and 64 welded to both ends of the plate 62. Both handle bars 65 and 66 have plastic hand grips 67 and 68.

Refer now to FIG. 7, FIG. 8, and FIG. 9. At the front of the carriage 60, there is a U-shaped supporting structure welded to the central rectangular cross-section tubing 61. The U-shaped structure is made out of plate 78 which is perpendicularly welded to the tubing 61, and two flat plates 70a and 70b parallel to the tubing 61, welded at each end of the plate 78. Bearings 71 and 72 are mounted to the plates 70a and 70b . These bearings rotatably support an axle 75, to which wheels 73 and 74, as well as a ratchet wheel 76, are all permanently attached. A sprocket 86 is rotatable mounted on the axle 75, and has a pawl 77 which interacts with the ratchet wheel 76. A bumper plate 79 is covered with rubber, and is attached to the front ends of the plates 70a and 70b . FIG. 8 is a sectional view as taken on view lines 2—2 of FIG. 7 showing the shaft 18 with the core of an expended roll 19, resting on the wheels 73 and 74. FIG. 9 is showing the shaft 18 resting on the wheels 73 and 74 without the core 19.

Refer now to FIG. 7. A commercial air gun 80 is shown in relation to a nozzle 81 which is attached to the plate 62, as shown in FIG. 1. The nozzle 81 is connected with an air cylinder 83 by a hose 82. The air cylinder 83 is rigidly mounted to the bottom of the tubing 61. A piston rod 84 of the cylinder 83 is connected to one of the ends of a chain 85. One end of chain 85 is engaged with sprocket 86, and the other end of chain 85 is connected with a return spring 87 located inside of the tubing 61. The spring 87 is attached to the inside wall of the tubing 61 by a pin 88.

Refer now to FIG. 6, FIG. 1, and FIG. 7. A shaft supporting and locking mechanism 100 is shown. The mechanism 100 has a base plate 111 to which a U-shaped plate 112 is vertically welded. A collar 110 is mounted on the main cylindrical portion of the shaft 18. The shaft 18 rests on the U-shaped plate 112, and is locked in position by a pivotally mounted arm 113. A link 115 connects the arm 113 to a lever 114. Both the arm 113 and the lever 114 are pivotally mounted on a base 118 which is attached to the base plate 111. The base plate 111 has a bolt 116, which engages with one of the holes 117, 117a , 117b , or 117c located on the top surface of the rectangular tube 61 shown on FIG. 1. Bolt 116 secures the supporting and locking mechanism 100 at a given distance from the wheels 73 and 74, and is thus adjustable depending on the length of the shaft 18.

Figure 10:
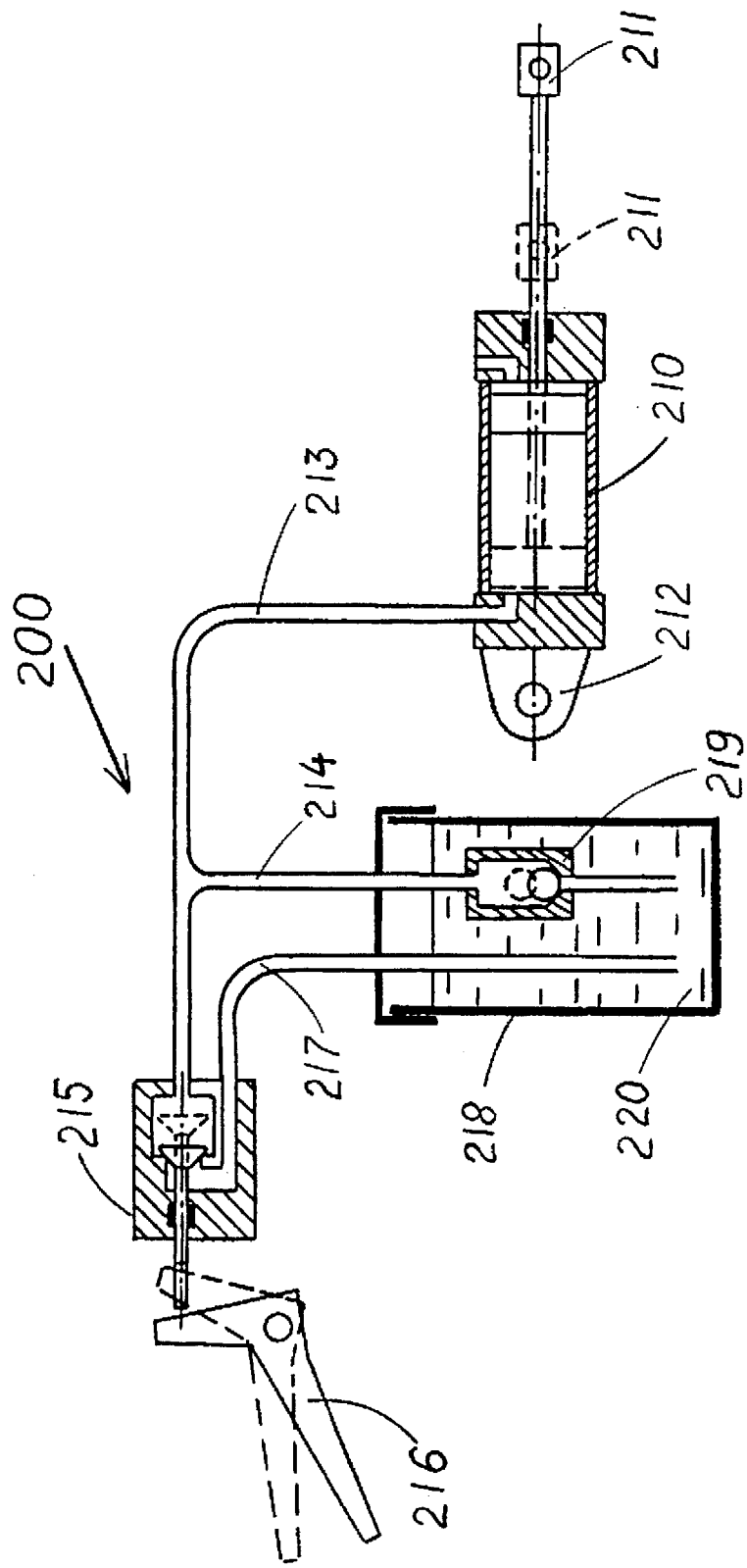
FIG. 10 is an illustration of a hydraulic system for controlling the force counterbalancing a shaft's weight.

FIG. 10 illustrates a hydraulic system 200. A hydraulic cylinder 210 is shown in a fully extended position on the FIGS. 1, 2, 3, and 4. The cylinder 210 is shown in fully contracted position on the FIG. 5. A piston rod 211 is pivotally attached to bottom suspended beam 40, and the cylinder's body is pivotally attached with a bracket 212 to the bottom of the base 11 of the apparatus 10. Refer again to FIG. 10 and FIG. 1. The cylinder 210 is connected with a valve 215 by a flexible hose 213. A hose 214 branches out of the house 213 and is connected to a one-way valve 219. The valve 219 is located inside of the reservoir 218 containing hydraulic fluid 220. The valve 215 has a hose 217 leading to the reservoir 218. The valve 215 is hand operated by a trigger 216.

OPERATION OF INVENTION

A shaft handling apparatus according to this invention is designed in a way that allows adjustment for handling shafts of various lengths and weights. For a particular shaft, the apparatus is adjusted as follows. Refer now to FIG. 1. The collar 110 is installed near one of the ends of the main cylindrical portion of shaft 18. The collar 110 is installed on the portion of the shaft 18 that is not occupied by the core 19 of a web roll. The supporting and locking mechanism 100 is secured to the top surface of the tube 61 with the bolt 116, using one of the mounting holes 117, 117a , 117b , or 117c . Depending on the length of a particular shaft, the appropriate mounting hole is selected so as to ensure that the wheels 73 and 74 support the shaft at approximately the center of its length. For a particular shaft 18, the air springs 50 and 51 have to be charged with just enough air pressure to enable the air springs to counterbalance the weight of the shaft and still allow the shaft to be lowered or elevated by pushing down or pulling up the hand grips 67 and 68.

The height of the handles 65 and 66 can be adjusted to suit the operator. This adjustment is done by loosening the clamps 63 and 64.

Figure 2:
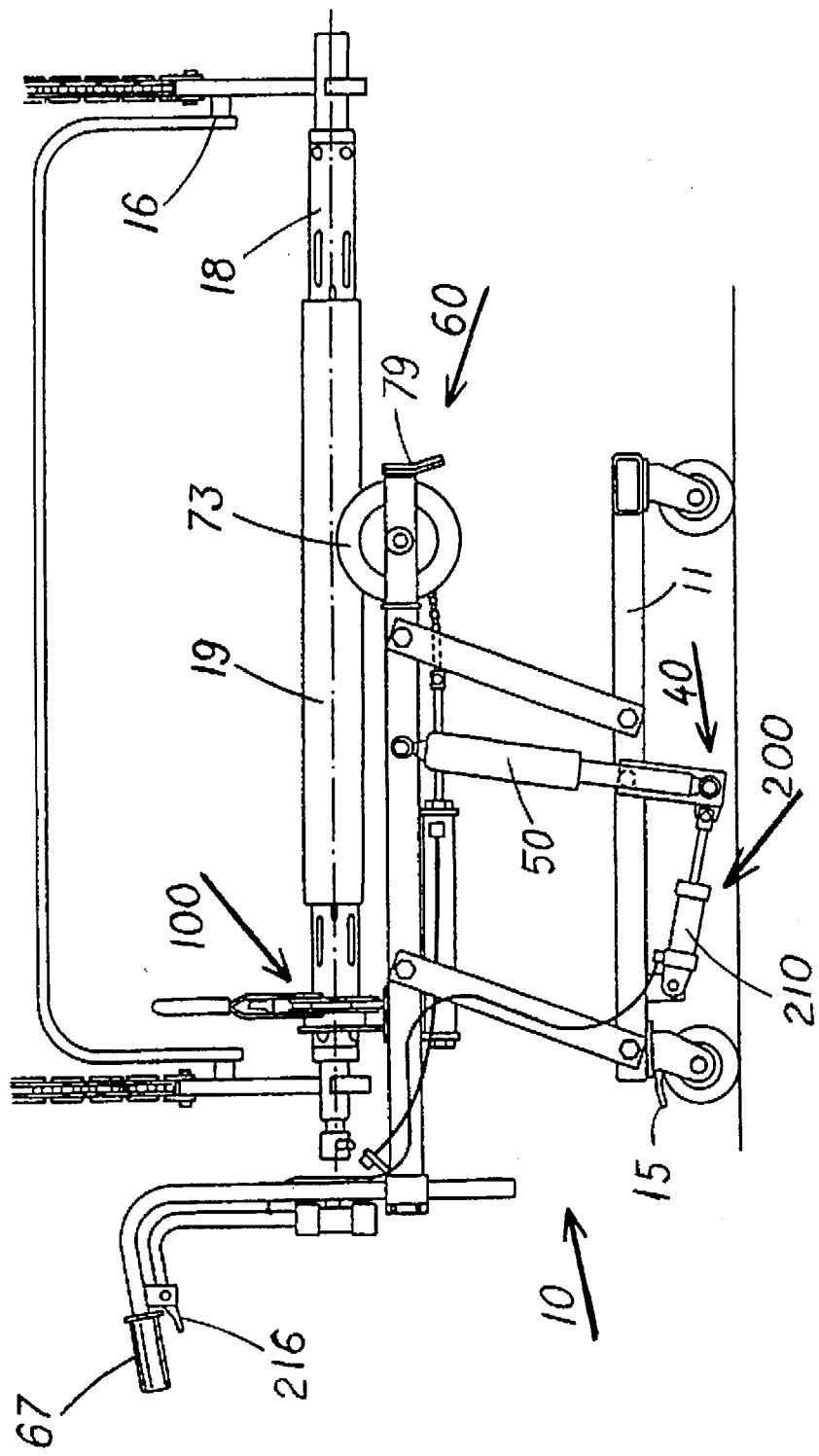
FIG. 2 is a side view showing how the shaft with the core is placed on the apparatus of the present invention by a lifting crane.
Figure 3:
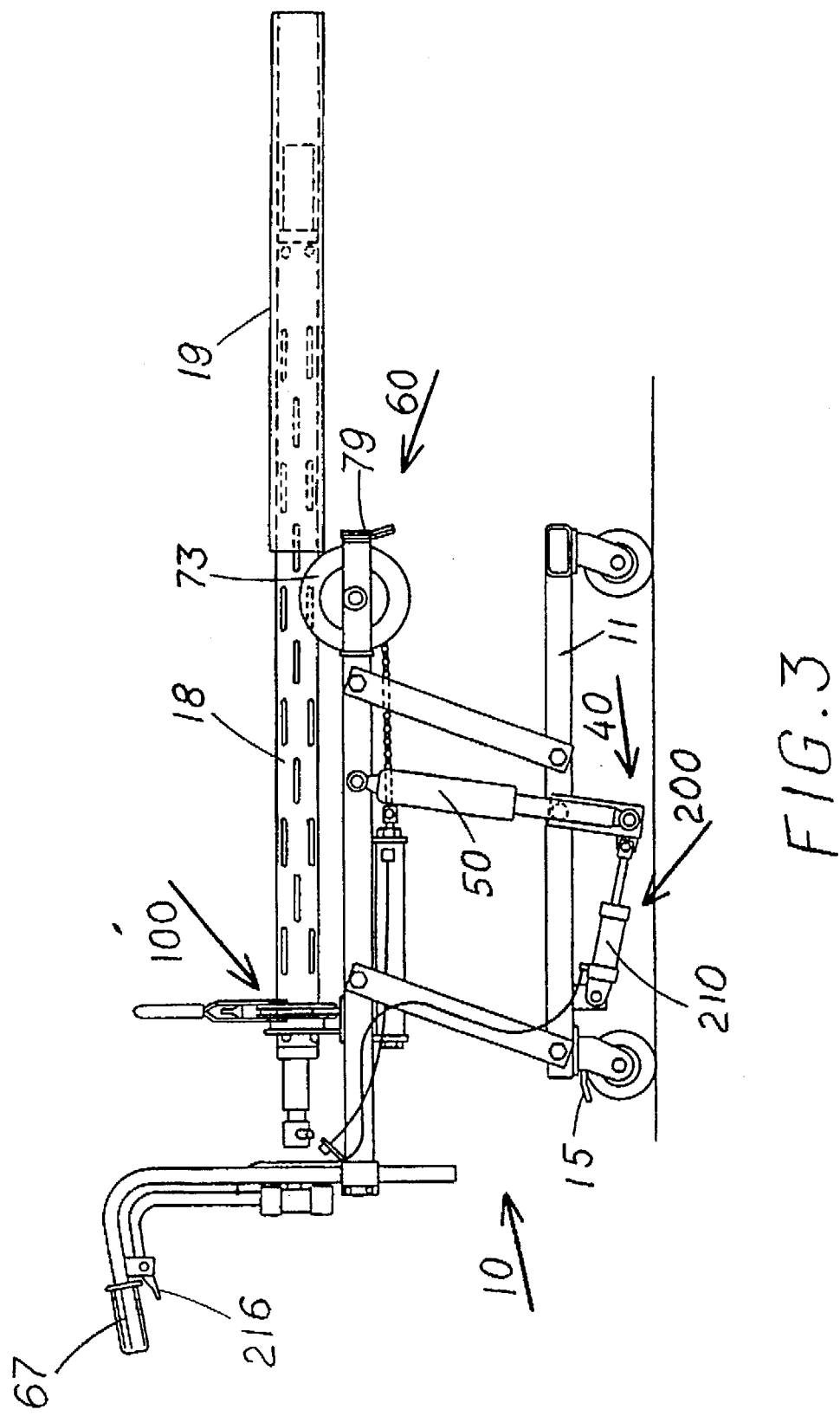
FIG. 3 is a side view of the present invention showing the stage of operation at which the core stripping mechanism has completed sliding the core to the front of the shaft.

FIGS. 2, 3, 4, and 5 show, in sequence, the stages of operation of the shaft handling apparatus of the present invention. Refer now to FIG. 2. The shaft 18 with the core 19 of an expended roll is placed by the hoist 16 on the shaft handling apparatus 10. The supporting and locking mechanism 100 is engaged and the shaft is securely locked in position. The shaft is also supported by the wheels 73 and 74 through the core 19.

Once the shaft 18 is secured to the shaft handling apparatus, the hoist 16 is entirely disengaged. The shaft handling apparatus can now be moved away to a more convenient location for the next stage.

The next stage of operation involves the stripping of the core 19 from the shaft 18. FIGS. 7, 8 and 9 illustrate the details of the core stripping mechanism. Refer now to FIG. 8. The shaft 18 with the core 19 rests on the wheels 73 and 74. Refer now to FIG. 7. When pressed against the nozzle 81, the air gun 80 supplies compressed air to the pneumatic cylinder 83, through the hose 82. The compressed air causes the piston rod 84 to contract and pull the chain 85. Since the chain 85 is engaged with the sprocket 86, the sprocket 86 is rotated when the chain 85 is pulled. The sprocket 86 has a pawl 77 which, in one direction only, transmits the rotational movement to the ratchet wheel 76. The ratchet wheel 76 and the wheels 73 and 74 are all permanently attached to the axle 75. When the ratchet wheel 76 is forced to rotate, the wheels 73 and 74, on which the shaft 18 and the core 19 rest are also forced to rotate. This rotation causes a frictional force to develop between the core 19 and the wheels 73 and 74, causing the core 19 to slide off of the shaft 18 as shown on FIG. 3. Then, when the piston rod 84 is fully contracted, the air gun 80 is pulled away from the nozzle 81 allowing the compressed air to escape from the cylinder 83. The one way ratchet mechanism consisting of pawl 77 and the ratchet wheel 76, along with the lack of compressed air in the cylinder 83, allow the return spring 87 to extend the piston rod 84 to its original position by pulling the chain 85, without having to turn the wheels 73 and 74. When the core 19 slides beyond the wheels 73 and 74, it can then be completely removed by the hands of an operator. When the core 19 is removed from the shaft 18, the shaft 18 rests on the wheels 73 and 74 as shown on FIG. 9. The shaft is now ready to be inserted into the core of a new web roll.

Figure 4:
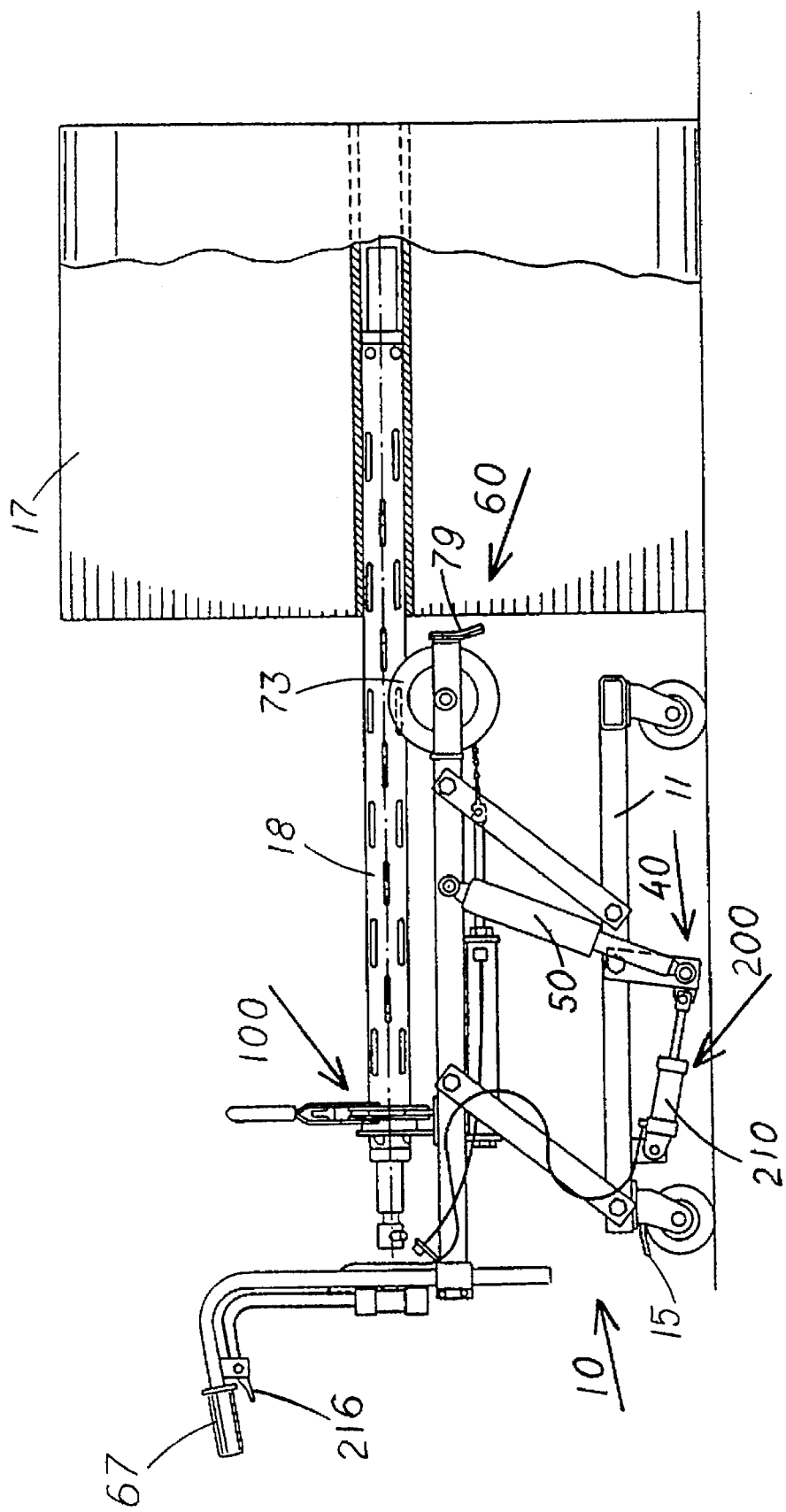
FIG. 4 is a side view of the present invention showing the stage of operation at which the shaft is introduced into a core of a new web roll.

Refer to FIG. 4. This stage of the shaft handling procedure requires the part of the shaft 18 which protrudes in front of the shaft handling apparatus 10, to be introduced into the core of a new web roll 17. To accomplish this stage, the apparatus 10 is first brought near the new web roll. By pushing the hand-grips 67 and 68, as described before, the shaft 18 can be lowered or elevated to align it with the core of the new web roll 17. Once aligned, the shaft 18 is pushed into the core of a new web roll 17.

Figure 5:
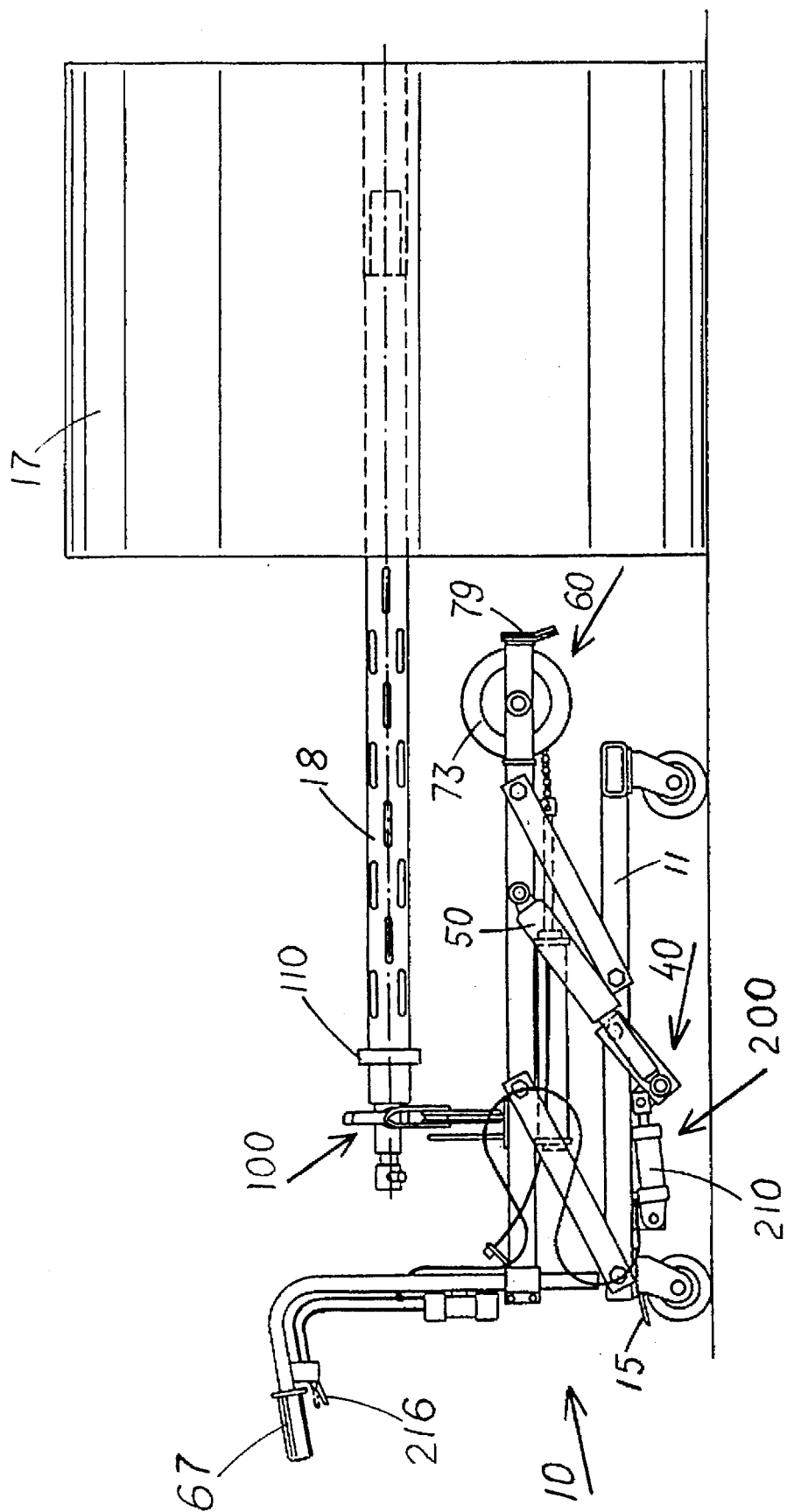
FIG. 5 is a side view of the present invention illustrating the stage of operation at which the apparatus is lowered and disengaged from a shaft.

Refer now to FIG. 5. With the shaft 18 partially introduced into the core of the new web roll 17, the shaft handling apparatus is disengaged from the shaft by disengaging the supporting and locking mechanism 100 shown in detail on FIG. 6. The carriage 60 is then lowered and the apparatus is pulled away from underneath the shaft. To make the lowering of the carriage 60 easy for the operator, the hydraulic system 200 is provided. The hydraulic system 200 makes it possible to decrease the counterbalancing force of the air-springs 50 and 51 by changing their position to less vertical. When the air-springs are positioned more horizontally, the component force acting vertically is decreased, and thus the force lifting the carriage 60 is decreased. Refer now to FIG. 1 and FIG. 10. The air-springs 50 and 51 are pivotally attached to the carriage 60 by the axle 53 and pivotally mounted to the suspending beam 40 by the axle 54. The suspending beam 40 is also pivotally mounted to the base 11, and naturally the beam 40 always tends to remain parallel to the air-springs 50 and 51. Keeping the suspending beam 40 from following the position of the air springs is the hydraulic cylinder 210. The cylinder 210 is connected with the hose 213 to the valve 215 which is attached to the handle 65. By pulling the trigger 216, an operator can open the valve 215 and release some or all of the hydraulic fluid from the cylinder 210 to the reservoir 218. As hydraulic fluid is released from the cylinder 210, the piston rod 211, which holds the suspending beam 40, is allowed to retract. As a result, the position of the suspending beam 40 can be controlled by the operator. In turn, controlling the position of the beam 40 enables the operator to control the angle of the air-springs 50 and 51 in relation to the carriage 60, and thus control the component force that lifts the carriage. Nevertheless, even when the suspending beam 40 is in its most backward position, as shown on FIG. 5, some vertical force still remains. Therefore, when neither the weight of the shaft nor the operator are pushing the carriage down, the air-springs are able to lift the carriage to its original position. Refer again to FIG. 10. This is also possible because the one-way valve 119, which is submerged in the hydraulic fluid 220, and which is connected to the cylinder 210 with the hose 214 and 213, will allow the hydraulic fluid to reenter the cylinder. By allowing the hydraulic fluid to reenter the cylinder, the piston rod 211 is allowed to extend, and the suspending beam 40 is also returned to its original position.

Refer now to FIG. 5. The rubber covered bumper plate 79 positioned on front of the shaft handling apparatus can be used to push the shaft 18 deeper into the core of the roll 17 utilizing momentum of the apparatus. This completes the shaft handling procedure.

When not in use, the shaft handling apparatus should be parked in a safe place and secured in position with the foot operated brake 15.

I claim as my invention:

1. An apparatus for handling a web roll shaft and removing from said shaft a core of the type that fit over the shaft as a sleeve, comprising:

a. a counterbalance means, said counterbalance means comprising one or more air springs, coupled to a upper carriage means primarily for carrying said shaft and a lower base means primarily for supporting said carriage means, said counterbalance means allowing vertical travel of said carriage means relative to said base means, and said counterbalance means providing a counterbalance force sufficient to support the combined weight of said shaft and said carriage means in a state of equilibrium such that said shaft and said carriage means can be easily raised or lowered relative to said base means by hands of an operator; and b. a core removing means for removing said core from said shaft, said core removing means employing friction force for removing said core, and said core removing means being attached to said carriage means and being in direct contact with said core when said shaft with said core is placed on said carriage means.

2. The apparatus of claim 1, wherein said core removing means comprises:

a. a roller means, rotatable around an axis of rotation, for rotatably contacting said core, said roller means being mounted with its axis of rotation perpendicular to the length of said shaft, such that rotation of said roller means may coincide with movement of said core along the length of said shaft; and b. a driving means for causing said roller means to rotate, whereby upon rotation of said roller means said core is driven along the length of said shaft.

3. The apparatus of claim 2, wherein said air springs are movably mounted to said base means and to said carriage means, allowing them to pivot from vertical to horizontal orientation.

4. The apparatus of claim 3, further comprising release means coupled to said air springs for decreasing the vertical force supplied by said air springs by allowing said air springs to pivot toward a more horizontal orientation, so that the weight of said carriage means provides substantially sufficient force to cause said carriage means to drop to a lower position relative to said base means.

5. The apparatus of claim 4, wherein said release means comprises a hydraulic cylinder coupled to said air springs such that the angular position of said air springs is controlled by said hydraulic cylinder.

6. The apparatus of claim 1, wherein the stiffness of said air springs can be adjusted to accommodate a number of shaft weights.

* * * * *